(12) United States Patent
Cortequisse

(10) Patent No.: US 10,280,940 B2
(45) Date of Patent: May 7, 2019

(54) BLADE AND SHROUD WITH SOCKET FOR A COMPRESSOR OF AN AXIAL TURBOMACHINE

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

(*) Notice: Subject to any disclaimer, the term of this patent is extended or adjusted under 35 U.S.C. 154(b) by 385 days.

(21) Appl. No.: 15/159,160

(22) Filed: May 19, 2016

(65) Prior Publication Data
US 2016/0341216 A1 Nov. 24, 2016

(30) Foreign Application Priority Data
May 21, 2015 (BE) .................................. 2015/5316

(51) Int. Cl.
*F01D 9/04* (2006.01)
*F04D 29/02* (2006.01)
(Continued)

(52) U.S. Cl.
CPC ........... *F04D 29/542* (2013.01); *F01D 9/044* (2013.01); *F04D 29/023* (2013.01);
(Continued)

(58) Field of Classification Search
CPC . F01D 9/04; F01D 9/042; F01D 9/044; F01D 25/246; F04D 29/023;
(Continued)

(56) References Cited
U.S. PATENT DOCUMENTS 5,074,752 A    12/1991   Murphy et al.
5,273,819 A  * 12/1993   Jex .......................... B29C 70/14
                                                            264/172.11
(Continued)

FOREIGN PATENT DOCUMENTS

EP    1111246 A1   6/2001
EP    2196629 A1   6/2010
(Continued)

OTHER PUBLICATIONS

Search Report dated Jan. 14, 2016 for BE 201505316.

*Primary Examiner* — Richard A Edgar
*Assistant Examiner* — Elton K Wong
(74) *Attorney, Agent, or Firm* — James E. Walton

(57) ABSTRACT

The present application is concerned with a blading structure of a compressor of an axial turbomachine for an aircraft. The blading structure includes a wall, such as a composite internal shroud with an organic matrix, which is intended to radially delimit a primary annular flow of the turbomachine and which comprises a fastening socket. The structure additionally has a blade fastened in the fastening socket and extending radially with respect to the wall, and a fastening layer at the interface between the blade and the socket. The interface includes asperities hugging the fastening layer, so as to ensure anchoring by engagement of material in order to fasten the blade in the socket by bonding. The present application also proposes a low-pressure compressor with an internal shroud with sockets bonded to blades.

14 Claims, 2 Drawing Sheets

(51) Int. Cl.
*F04D 29/16* (2006.01)
*F04D 29/32* (2006.01)
*F04D 29/54* (2006.01)
*F04D 29/64* (2006.01)

(52) U.S. Cl.
CPC ......... *F04D 29/164* (2013.01); *F04D 29/324* (2013.01); *F04D 29/644* (2013.01); *F05D 2240/11* (2013.01); *F05D 2300/431* (2013.01); *F05D 2300/437* (2013.01); *Y02T 50/672* (2013.01)

(58) Field of Classification Search
CPC .... F04D 29/102; F04D 29/122; F04D 29/164; F04D 29/324; F04D 29/54; F04D 29/542; F04D 29/644; F05D 2240/11; Y02T 50/672
See application file for complete search history.

(56) References Cited

U.S. PATENT DOCUMENTS

| | | | | |
|---|---|---|---|---|
| 2006/0222487 | A1* | 10/2006 | Au | F01D 9/04 415/174.4 |
| 2011/0243752 | A1* | 10/2011 | Duchaine | B29C 53/587 416/241 R |
| 2013/0108427 | A1* | 5/2013 | Brassine | B29C 45/16 415/200 |

FOREIGN PATENT DOCUMENTS

| | | | |
|---|---|---|---|
| EP | 2434101 | A1 | 3/2012 |
| EP | 2586989 | A1 | 5/2013 |
| EP | 2801702 | A1 | 11/2014 |

\* cited by examiner

US 10,280,940 B2

BLADE AND SHROUD WITH SOCKET FOR A COMPRESSOR OF AN AXIAL TURBOMACHINE

This application claims priority under 35 U.S.C. § 119 to Belgium Patent Application No. 2015/5316, filed 21 May 2015, titled "Blade and Shroud with Socket for a Compressor of an Axial Turbomachine," which is incorporated herein by reference for all purposes.

BACKGROUND

1. Field of the Application

The present application relates to the fastening by socket of a shroud or of a platform to a blade. The present application is also concerned with a blading structure of an axial turbomachine. Moreover, the present application proposes a compressor and an axial turbomachine, in particular an aircraft turbojet or turboprop.

2. Description of Related Art

A turbomachine comprises a plurality of compartments, including compressors and turbines. The compressors align a plurality of annular rows of stator blades, where appropriate provided with internal shrouds suspended at the internal ends of the aforementioned blades. These shrouds connect a plurality of consecutive blades and support layers of abradable materials providing dynamic sealing with the rotor.

An internal shroud can be suspended in various ways to the blades which support it. A shroud can be anchored with the aid of retention plates bonded through openings formed in the ends of blades. However, this technique requires complex manipulations to suitably place each plate. Alternatively, an internal shroud can have a series of openings extended by reinforcements. A material is then applied between the reinforcements and the blades to connect them.

Document EP2196629A1 discloses a compressor of an axial turbomachine comprising an annular row of stator blades and an internal shroud fastened to the internal ends of the blades. The internal shroud is segmented and is produced from a composite material. It has an annular row of openings extended by fastening sockets for the ends of blades. A considerable space is formed between the internal ends of the blades and the inner surfaces of the sockets. This space accommodates a material allowing a connection. However, the strength of this connection is limited. Owing to the vibrations in the turbomachine, loss of cohesion can occur.

Although great strides have been made in the area of blading structures for axial turbomachines, many shortcomings remain.

DETAILED DESCRIPTION OF THE PREFERRED EMBODIMENT

Figure 1:
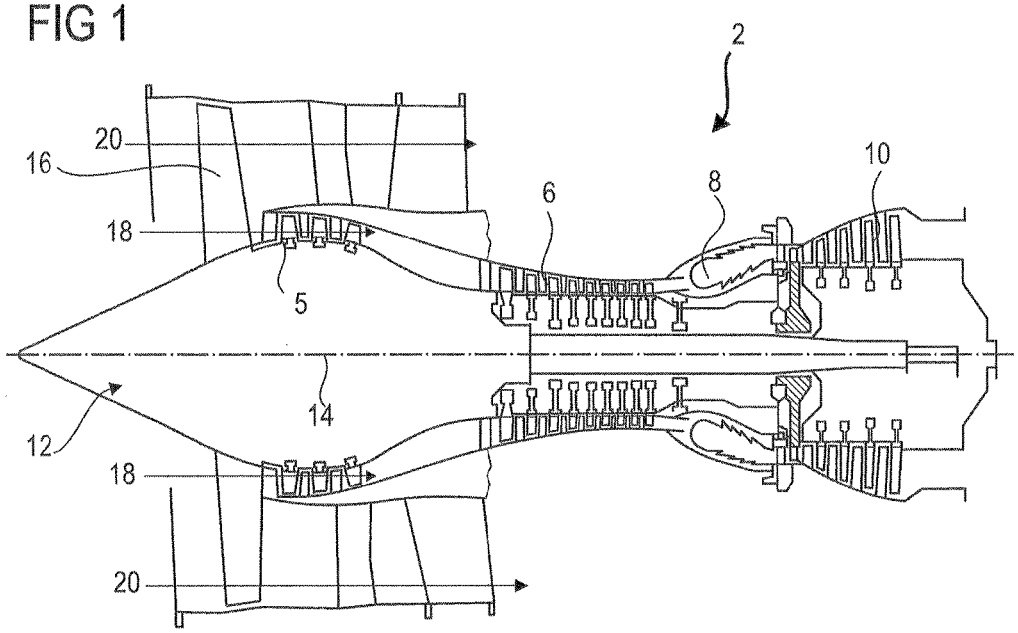
FIG. 1 represents an axial turbomachine according to the present application.

The present application aims to solve at least one of the problems posed by the prior art. More precisely, an objective of the present application is to improve the fastening of a shroud. Another solution of the present application is to secure the fastening of a shroud with socket to a blade.

It will have been readily understood that a subject of the present application is a blade of an axial turbomachine, in particular of a compressor of an axial turbomachine, the blade comprising: a wall which comprises: a guide surface intended to radially delimit an annular flow of the turbomachine, and a fastening socket; an airfoil which comprises: a portion fastened in the socket and an aerodynamic portion intended to deflect the annular flow, noteworthy in that it additionally comprises a cementation layer at the interface between the airfoil and the socket so as to fasten the airfoil to the wall by bonding.

The term "blading" is understood to mean a rigid surface making it possible to guide a flow.

Another subject of the present application is a blading structure of an axial turbomachine, in particular of a compressor of an axial turbomachine, the structure comprising: a wall which is intended to radially delimit an annular flow of the turbomachine and which comprises a fastening socket, a blade fastened in the fastening socket and extending radially with respect to the wall, and a fastening layer at the interface between the blade and the socket, noteworthy in that the interface comprises asperities in contact with the fastening layer so as to ensure anchoring by engagement of material in order to fasten the blade in the wall.

According to one advantageous embodiment of the present application, the asperities in contact with the fastening layer are formed on the blade and/or inside the socket, and preferably the asperities are distributed axially.

According to one advantageous embodiment of the present application, the blade comprises a pressure surface and a suction surface, asperities being distributed over the pressure surface and/or over the suction surface inside the socket.

According to one advantageous embodiment of the present application, the blade comprises a curved surface and/or a domed surface inside the socket, at least one or each of the said surfaces receiving asperities.

According to one advantageous embodiment of the present application, the socket comprises an inlet, an outlet and a sealed passage which connects the inlet to the outlet, the inlet and the outlet being radially opposite and each having a curved-blade aerodynamic section shape, and preferably the passage passes through the wall radially.

According to one advantageous embodiment of the present application, the socket surrounds the blade, where appropriate in a continuous manner; preferably the socket is generally profiled radially with a profile generally hugging the blade, the said profile having a convex edge.

According to one advantageous embodiment of the present application, the fastening layer is a bonding layer, and preferably the fastening layer is a seal between the socket and the blade.

According to one advantageous embodiment of the present application, the fastening layer surrounds the blade, and, where appropriate, the interface is filled by the fastening layer.

According to one advantageous embodiment of the present application, the blade comprises a leading edge and a trailing edge, the leading edge and/or the trailing edge forming a sharp edge or edges, and, where appropriate, the fastening layer is an elastic material and/or a polymer in contact with each sharp edge.

According to one advantageous embodiment of the present application, the airfoil extends radially with respect to the wall.

According to one advantageous embodiment of the present application, the wall is monobloc and/or integrally formed; preferably the wall comprises a web forming the guide surface, the web and the socket being monobloc and/or integrally formed.

According to one advantageous embodiment of the present application, the asperities comprise rounded surfaces.

According to one advantageous embodiment of the present application, the asperities formed on the blade are recesses, which are preferably curved.

According to one advantageous embodiment of the present application, the fastening layer comprises elastomer, where appropriate silicone.

According to one advantageous embodiment of the present application, the or each annular seal is adapted to cooperate with lips of the rotor of the turbomachine.

According to one advantageous embodiment of the present application, at least one or each asperity forms a round or square or polygonal impression on its reception surface.

According to one advantageous embodiment of the present application, the interface has a plurality of asperities arranged behind one another axially and/or above one another radially, the said asperities being, where appropriate, formed on one and the same surface. Thus, the interface has a plurality of variations in thickness which increase the engagement of material.

Another subject of the present application is a compressor of a turbomachine, in particular an aircraft turbojet, the compressor comprising an internal shroud with sockets, an annular row of blades fastened in the sockets with the aid of fastening seals, noteworthy in that the blades and/or the sockets comprise asperities engaging the fastening seals.

Another subject of the present application is a compressor of an axial turbomachine, in particular a low-pressure compressor, the compressor comprising at least one blading structure, noteworthy in that the or each blading structure is in accordance with the present application, and preferably the compressor comprises a plurality of blades arranged in one or more annular rows of blades.

According to one advantageous embodiment of the present application, the wall is common to a series of blading structures, which are for example consecutive in one and the same annular row.

According to one advantageous embodiment of the present application, the wall is a shroud or an angular shroud segment fastened to a plurality of blades.

According to one advantageous embodiment of the present application, the wall is an internal shroud or an angular internal shroud segment fastened to a plurality of blades of one and the same row.

According to one advantageous embodiment of the present application, the wall is a composite wall with an organic matrix, and, where appropriate, with fibres having lengths less than 10 mm, preferably less than 3 mm.

According to one advantageous embodiment of the present application, the wall comprises an internal surface and at least one annular seal, in particular at least one layer of abradable material covering the said internal surface, the annular seal being, where appropriate, in contact with a plurality of sockets or with each socket.

According to one advantageous embodiment of the present application, the wall comprises an annular seal which is radially and/or axially at a distance from the sockets.

According to one advantageous embodiment of the present application, the wall comprises a profile of revolution with a base extending mainly axially and two radial extensions extending radially inwards from upstream and downstream of the base; each internal radial end of an extension comprising an annular seal, in particular an abradable seal.

According to one advantageous embodiment of the present application, the sockets form at least one annular row of sockets, preferably a plurality of annular rows of sockets.

According to one advantageous embodiment of the present application, the blade portion housed in the socket has a mean chord inclined by at least 5° with respect to the axis of rotation of the compressor, preferably at least 10°. Consequently, the fastening seal works in compression and limits shear.

According to one advantageous embodiment of the present application, the socket is open-ended, the blade passing right through the socket, and preferably the blade comprises two portions of the same length arranged on either side of the socket.

Another subject of the present application is an axial turbomachine, in particular an aircraft turbojet, comprising at least one blading structure, noteworthy in that the or each structure is in accordance with the present application, and preferably the turbomachine comprises a compressor, the compressor being in accordance with the present application.

Generally, the advantageous embodiments of each subject of the present application are also applicable to the other subjects of the present application. In so far as is possible, each subject of the present application can be combined with the other subjects.

The present application makes it possible to increase anchoring between the blade and the socket via the fastening layer since it exploits an engagement of material. Fastening is ensured by the shear strength of the layer in addition to its possible adhesive qualities. The blade portion receiving asperities is curved, with the result that its asperities are subjected to differently distributed tension-compression and shear forces. Any breakage in the fastening layer will be able to be more progressive.

The present application makes it possible to use materials forming a block of material, where appropriate with reduced adhesion. Should a blade or a shroud segment need to be replaced, the removal of the fastening layer is simplified since it hardly sticks. A thermoplastic layer can thus be removed by heat treatment, which reduces or eliminates the necessary physical and/or chemical operations. Any other material melting at a temperature below that of the sockets may be suitable.

In the description which will follow, the terms inner or internal and outer or external pertain to a positioning relative to the axis of rotation of an axial turbomachine. The axial direction corresponds to the direction along the axis of rotation of the turbomachine.

FIG. 1 represents, in a simplified manner, an axial turbomachine. What is concerned in this precise case is a double-flow turbojet able to exert a thrust for the propulsion of an aircraft. The turbojet 2 comprises a first compression level, termed low-pressure compressor 5, a second compression level, termed high-pressure compressor 6, a combustion chamber 8 and one or more turbine levels 10. During operation, the mechanical power of the turbine 10 transmitted via the central shaft to the rotor 12 imparts movement to the two compressors 5 and 6. The latter comprise a plurality of rows of rotor blades associated with rows of stator blades. The rotation of the rotor about its axis of rotation 14 thus makes it possible to generate an air flow and to progressively compress the latter up to the inlet of the combustion chamber 8. Step-down means can increase the speed of rotation transmitted to the compressors.

An inlet blower commonly referred to as a fan 16 is coupled to the rotor 12 and generates an air flow which is divided into a primary flow 18 passing through the various aforementioned levels of the turbomachine, and a secondary flow 20 passing through an annular duct (represented in part) along the machine so as to subsequently join up with the primary flow at the turbine outlet. The secondary flow can be accelerated so as to generate a thrust reaction. The primary 18 and secondary 20 flows are annular flows and are channeled through the casing of the turbomachine. To this end, the casing has cylindrical walls or shrouds which may be internal and external.

Figure 2:
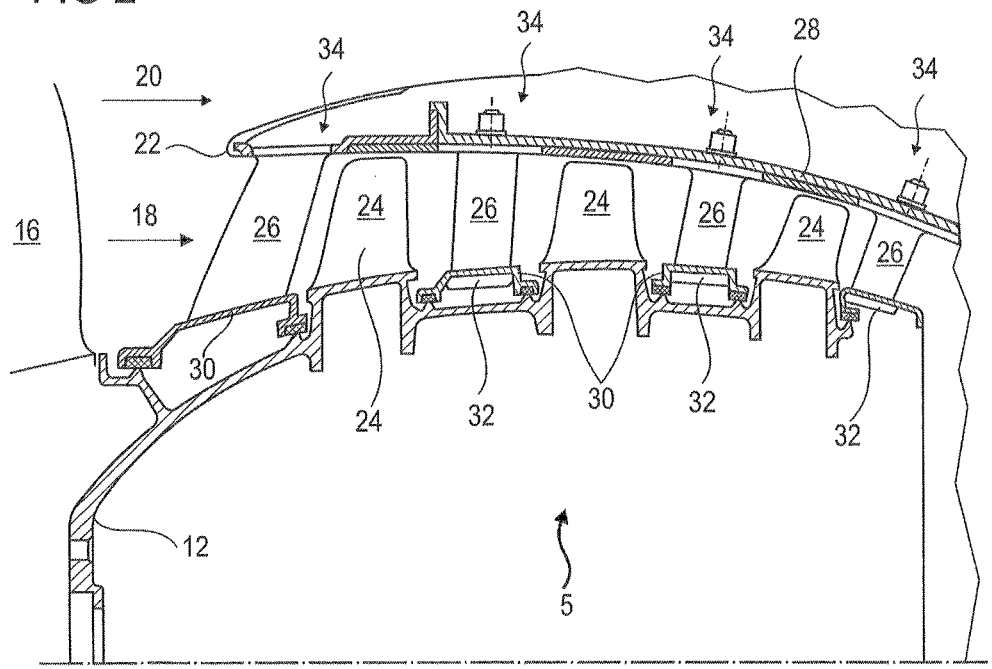
FIG. 2 is a diagram of a turbomachine compressor according to the present application.

FIG. 2 is a view in section through a compressor of an axial turbomachine such as that of FIG. 1. The compressor can be a low-pressure compressor 5. There can be observed there a part of the fan 16 and the splitter nose 22 for separating the primary flow 18 and the secondary flow 20. The rotor 12 comprises a plurality of rows of rotor blades 24, in this instance three.

The low-pressure compressor 5 comprises a plurality of sets of guide vanes, in this instance four sets, which each contain at least one row of stator blades 26. The sets of guide vanes are associated with the fan 16 or with a row of rotor blades 24 in order to straighten the air flow 18 so as to convert the speed of the flow into static pressure.

The stator blades 26 extend essentially radially from an outer casing 28 and can be fastened and immobilized there with the aid of bolts. They are regularly spaced from one another and have the same angular orientation in the flow 18. Advantageously, the blades of one and the same row are identical. Each stator blade 26 has a radial stack of aerodynamic sections configured to be able to deflect the primary flow.

At least one or each set of guide vanes can comprise a wall 30, in particular an internal shroud 30. The wall 30 is fastened to the internal ends of the stator blades with the aid of sockets 32. At least one or each shroud can be circular or formed of angular segments. The wall can be formed of portions, each assigned to a stator blade, it being possible for these portions to be blade platforms. The combination of a blade and the wall, or at least a wall portion, can form a blading structure 34. The turbomachine and/or the compressor 5 can comprise a plurality of blading structures 34 aligned in one or more annular rows.

A wall 30 must therefore connect a plurality of blades since it is fastened there. The wall 30 can comprise a polymer material, in particular a composite material with an organic matrix. The composite can be filled with short fibres, that is to say with fibres having an average length less than 10 mm, preferably less than 5 mm, more preferably less than 2 mm. The wall 30 can, of course, be produced from metal. The shroud, that is to say the wall 30, can be moulded or be produced by additive manufacturing in order to produce complex shapes, for example undercuts in the sockets 32.

Figure 3:
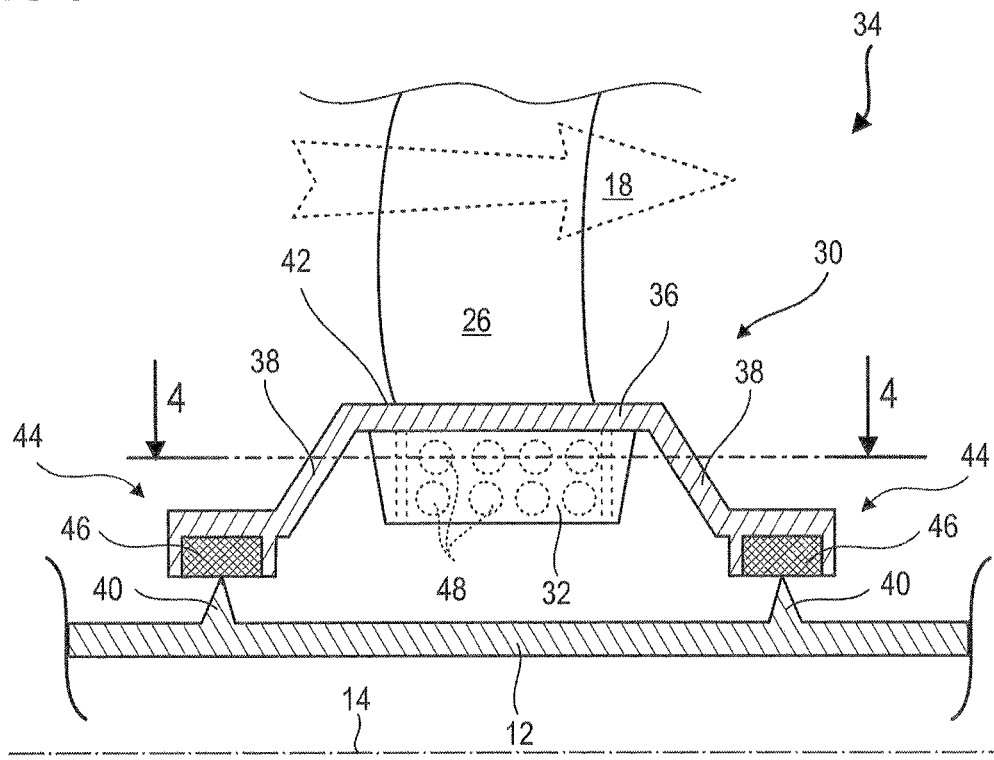
FIG. 3 illustrates a side view of a blading structure according to the present application.

FIG. 3 represents a profile view of a blading structure 34 of a compressor, for example the compressor illustrated in FIG. 2.

The wall 30 can comprise a profile of revolution about the axis of rotation of the turbomachine 14. The profile can comprise a base 36, for example a central base 36, which is connected to the blade 26. The base 36 extends mainly axially and can be substantially inclined with respect to the axis 14. The profile can also comprise two radial extensions 38, one upstream and one downstream. Each of them extends from the base 36 towards the rotor 12, in particular towards an annular rib 40, also termed lip 40, of the rotor 12. They can move apart from one another towards the interior. Thus, the base 36 generates by rotation a substantially tubular strip, and the extensions 38 give rise to radial flanges. This configuration of the wall 30 has an axially elongated appearance.

The wall 30 can comprise a surface 42 for guiding and/or delimiting the annular flow 18 of the turbomachine. This surface 42, for example an external surface, can be generally tubular or shaped as an arc of a circle. It is arranged between the socket 32 and the airfoil of the blade 26. The airfoil is the portion of the blade 26 that is intended to extend radially in the flow 18, and it forms the radial majority of the blade 26.

At least one or each wall 30 can support a dynamic sealing device 44 which surrounds the rotor 12. At least one or each sealing device 44 can comprise one or more annular sealing layers 46 which cooperate with the external surface of the rotor 12, in particular with its lips 40. A sealing layer 46 can be produced from abradable material, that is to say a friable material, which disaggregates into powder in the event of contact with the lips 40. Thus, the sealing device 44 is able to come into contact with the rotor 12 without damaging it; it can therefore be designed to come as close as possible to the rotor 12, thus making it possible to optimize dynamic sealing. A layer may be a cementation. It may be a resin which becomes rigid after polymerization or after curing. An acrylic resin may be used. At least one or each sealing layer 46 can be borne by one of the radial extensions 38 of the profile of the wall 30. Such a configuration is moreover known from document EP2801702 A1.

According to a variant of the present application, the seal comprises a layer filling the annular space between the base 36 and the extensions 38 of the wall 30. This layer, for example an abradable layer, can be in contact with the sockets 32 and, where appropriate, shut off an opening thereof. The seal can also be in contact with each fastening layer.

The wall 30 is connected to the blade 26 by virtue of its fastening socket 32, for example arranged at the base 36. Each blade 26 of a row or of each row can thus be fastened to a wall 30 of the compressor. In order to improve fastening and, where appropriate, sealing, the interface between the blade and the socket is plugged by a fastening layer. The retention is further improved wih the aid of asperities 48 at the blade-socket interface, the said asperities 48 being able to be distributed radially and axially in the interface.

According to the present application, the blading structure 34 could be formed on any blading of the turbomachine presented in relation to FIG. 1. The blading structure 34 is here described as a stator part, but it could also be a rotor part. Only one end of a blade 26 is represented here. However, it is conceivable to connect the two ends of a blade with the aid of sockets on two walls, such as an external casing and an internal shroud, the interfaces each having asperities and fastening layers. Mixed fastenings are conceivable, as are mixed rows of blades.

Figure 4:
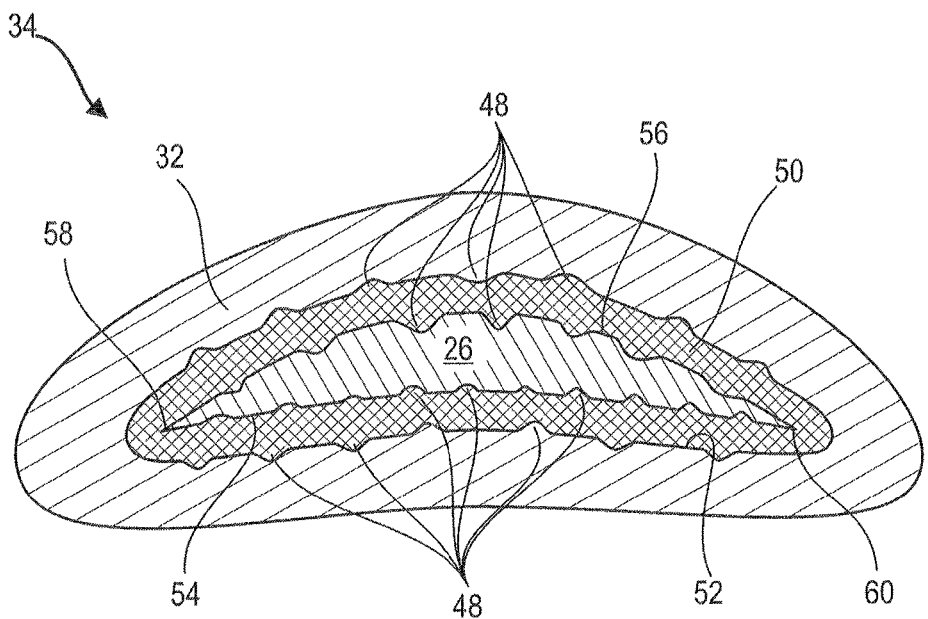
FIG. 4 depicts a section through the blading structure according to the present application along the axis 4-4 indicated in FIG. 3.

FIG. 4 represents a section through the blading structure 34 along the axis 4-4 indicated in FIG. 3. The fastening layer 50 separates the socket 32 from the end of the stator blade 26.

The socket 32 forms a sleeve surrounding the end of the blade 26. It can form a sealed continuous duct. In this way, it can receive the fastening layer 50, for example in pasty or fluid form. The profile of its internal surface is derived from that of the blade 26 and it comprises a side 52, for example a pressure side, which is domed to increase the blade-socket retention.

The asperities 48 are distributed both over the pressure face 54 and over the suction face 56 of the blade 26. The first can be curved and concave. The second can be domed and convex. The asperities can also be formed on the internal surface of the socket 32, in this instance the surface which surrounds and which faces the end of the blade 26. Certain asperities 48 of the blade 26 can be opposite asperities of the socket 32, which makes it possible to thin the fastening layer 50 in some places and to thicken in other places to form stronger bodies of material. The fastening layer hugs the blade and the socket, and in particular the asperities.

The asperities 48 are distributed axially over the surfaces of the blades 26 and of the socket 32. They can form steps and cavities. The asperities 48 hug the fastening layer, and vice versa, so as to ensure anchoring by engagement of material. They form variations in thickness on the fastening layer 50. They can also form bosses or teeth projecting on their respective implantation surface (54; 56).

The fastening layer 50 surrounds the blade 26, grips around it in a continuous manner and makes it possible to maintain a spacing between the blade 26 and its socket 32, for example to avoid contact between them so as to isolate them. In particular, the fastening layer 50 envelopes the extension of the leading edge 58 and the extension of the trailing edge 60. The fastening layer 50 can be a polymer material making it possible to resist the sharp projecting aspect of the leading edge 58 and the trailing edge 60. Thus, the fastening layer 50 distributes the stresses from the edges (58; 60) towards the socket in order to preserve it.

The fastening layer 50 can be a bonding layer 50. It can be a material which is applied in pasty form and which then hardens in order to anchor the blade 26 in the socket 32. The fastening layer 50 can also form a seal through the passage delimited by the socket 32. It can be an elastomer, such as a silicone.

I claim:

1. A blading structure of an axial turbomachine, comprising:
   a wall which radially delimits an annular flow of the turbomachine and which comprises:
      a fastening socket;
   a blade fastened in the socket and extending radially with respect to the wall; and
   a fastening layer surrounding the blade and arranged between the blade and the socket;
   wherein the socket and blade comprise:
      asperities in contact with the fastening layer so as to ensure anchoring by engagement of material in order to fasten the blade in the wall, wherein the asperities of the socket are constituted by a plurality of asperities radially above one another and the asperities of the blade are constituted by a plurality of asperities radially above one another.

2. The blading structure in accordance with claim 1, wherein the asperities are distributed axially.

3. The blading structure in accordance with claim 1, wherein the blade comprises a pressure surface and a suction surface, and wherein the asperities of the blade are distributed over the pressure surface or over the suction surface.

4. The blading structure in accordance with claim 1, wherein the socket surrounds the blade in a continuous manner.

5. The blading structure in accordance with claim 1, wherein the socket is generally profiled radially with a profile generally hugging the blade, the profile having a convex edge.

6. The blading structure in accordance with claim 1, wherein the fastening layer is a seal between the socket and the blade.

7. The blading structure in accordance with claim 1, wherein the blade comprises:
   a leading edge; and
   a trailing edge;
   wherein the leading edge and the trailing edge each form a sharp edge, and the fastening layer is an elastic material or a polymer in contact with each sharp edge.

8. A compressor of an axial turbomachine, comprising:
   at least one blading structure comprising:
      a wall which radially delimits an annular flow of the turbomachine and which comprises:
         a fastening socket;
      a blade fastened in the socket and extending radially with respect to the wall; and
      a fastening layer surrounding the blade and arranged between the blade and the socket; and
   a plurality of blades arranged in one or more annular rows of blades;
   wherein the socket and blade of the blading structure comprise:
      asperities in contact with the fastening layer so as to ensure anchoring by engagement of material in order to fasten the blade in the wall, wherein the asperities of the socket are constituted by a plurality of asperities radially above one another and the asperities of the blade are constituted by a plurality of asperities radially above one another.

9. The compressor in accordance with claim 8, wherein the wall is common to several blading structures, which are consecutive in one and the same annular row.

10. The compressor in accordance with claim 8, wherein the wall is a shroud fastened to a plurality of blades.

11. The compressor in accordance with claim 8, wherein the wall is an internal shroud fastened to a plurality of blades of one and the same row.

12. The compressor in accordance with claim 8, wherein the wall is a composite wall with an organic matrix and with fibres having lengths less than 10 mm.

13. The compressor in accordance with claim 8, wherein the wall comprises:
   an annular seal which is radially and axially at a distance from the sockets.

14. The compressor in accordance with claim 8, wherein the wall comprises:
   a profile of revolution with a base extending mainly axially and two radial extensions extending radially inwards from upstream and downstream of the base, each internal radial end of each extension comprising:
      an annular seal.

* * * * *